Figure 1:
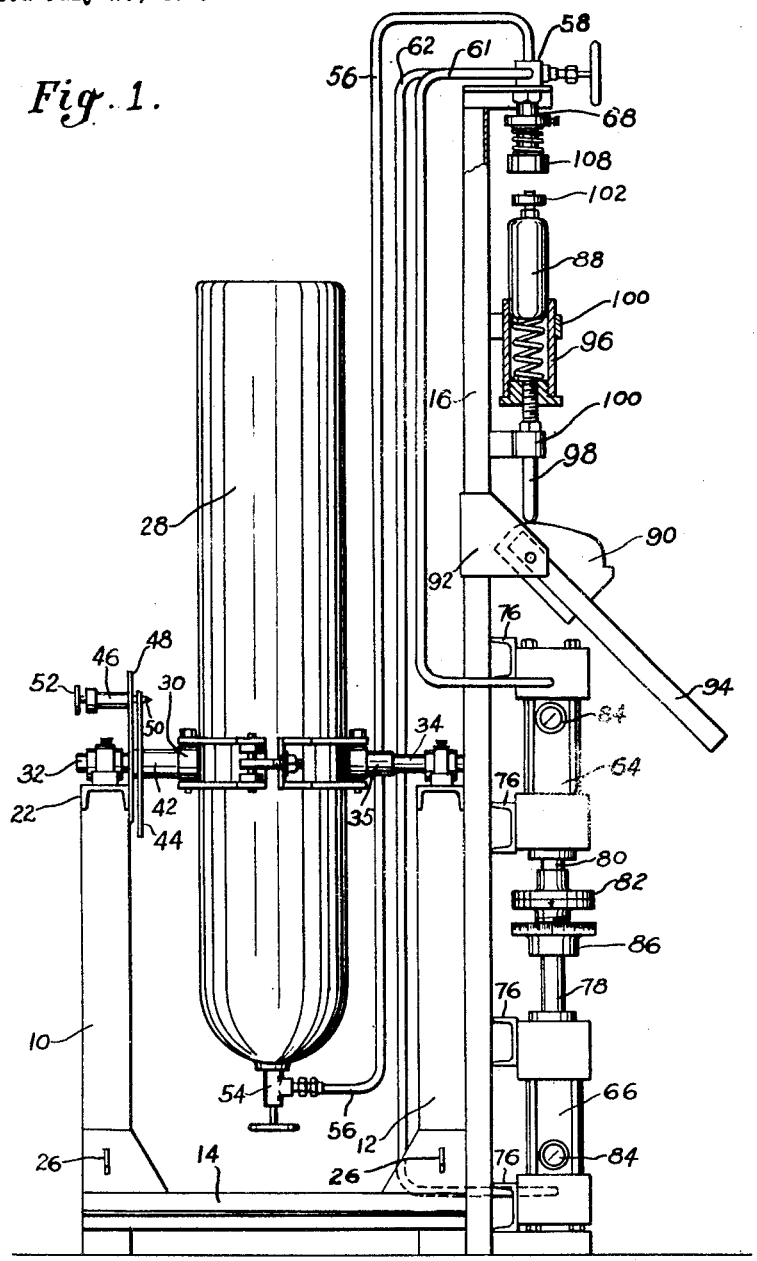

May 16, 1950     A. BROTHMAN     2,508,142
APPARATUS FOR FIELD-FILLING HIGH-PRESSURE DISPENSERS

Filed July 28, 1945     2 Sheets—Sheet 1

INVENTOR.
Abraham Brothman

May 16, 1950  A. BROTHMAN  2,508,142
APPARATUS FOR FIELD-FILLING HIGH-PRESSURE DISPENSERS
Filed July 28, 1945  2 Sheets-Sheet 2
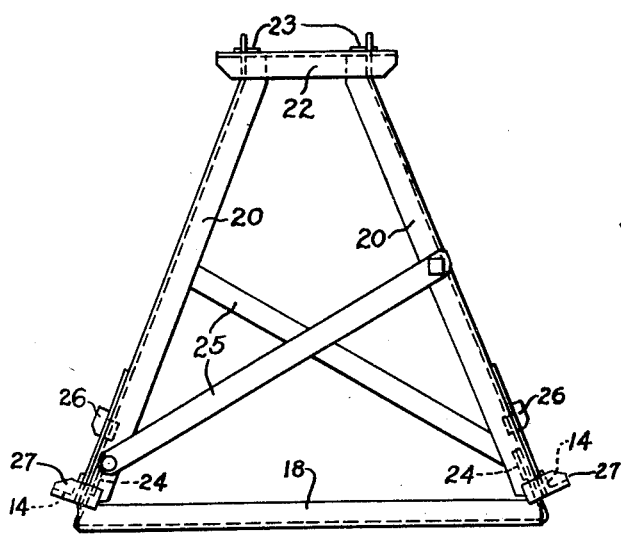
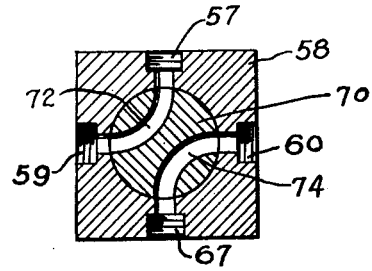
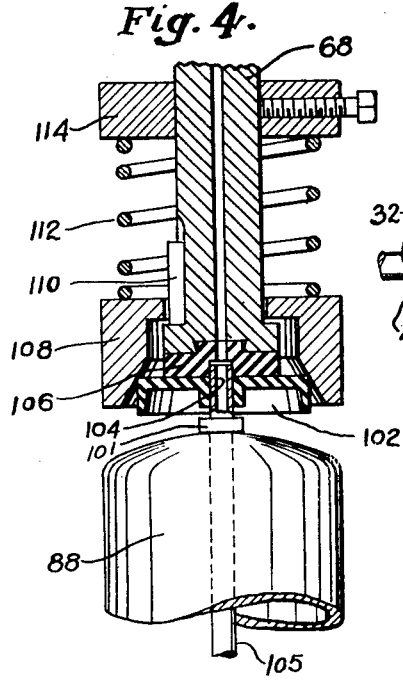
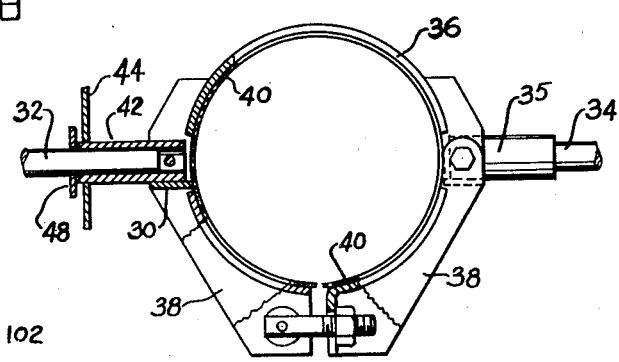
INVENTOR.
Abraham Brothman
BY
Pennie, Davis, Marvin & Edmonds
Attorneys Patented May 16, 1950

2,508,142

UNITED STATES PATENT OFFICE 2,508,142

APPARATUS FOR FIELD-FILLING HIGH-PRESSURE DISPENSERS

Abraham Brothman, Long Island City, N. Y., assignor to A. Brothman & Associates, New York, N. Y., a partnership Application July 28, 1945, Serial No. 607,609

2 Claims. (Cl. 62—1)

My invention relates to the filling of aerosol insecticide dispensers and more particularly to a readily portable apparatus for the filling of such dispensers in the field.

An insecticide dispenser "bomb" now used for killing insects carrying malaria and other diseases is used very extensively by the armed forces in combat areas. These insecticide "bombs" or dispensers comprise a grenade-like case provided with a valve means by which the insecticide may be released by the mere pressure of the operator's thumb. The dispensers are filled with a volatile solution containing a pesticide as a main ingredient, a stabilizing agent and an expellent. As an example, such a solution used as an insecticide contains a small proportion of pyrethrum extract, some mineral or other oil and "Freon-12" ($CCl_2F_2$). The expellent may be stored gas under pressure or a low boiling point liquid which is miscible with the main or active ingredient. In the dispenser the expellent acts to force the solution of the main ingredient up a standpipe to the dispenser valve and across an orifice at which the solution is atomized. "Freon-12" has been found to be one of the most efficient of the low boiling liquids for this purpose, since it combines the property of being miscible with a wide range of other organic solvents, a high solvent power for organic materials and a high vapor pressure at comparatively low temperatures. The main or active ingredient may be an insecticide, a fungicide, a germicide, a plant hormone or any other material one may wish to atomize. It may be a liquid or in solution in a liquid which is miscible with a liquid expellent. The stabilizing agent may be any suitable material which functions to stabilize the "emulsion" or fog formed between the atomized material and the atmosphere in which it is distributed by the dispenser.

The effectiveness of these aerosol dispensers may be illustrated by the report that a dispenser containing one pound of the insecticide solution will produce enough fog to kill all the mosquitoes in ten rooms, ten feet high and ten feet square, every day for fifty days. The fog or mist penetrates everywhere that smoke would penetrate, but is harmless to man and other warm-blooded animals.

At the present time these insecticide dispensers, mostly containing one pound of insecticide solution, are distributed to the armed forces in combat areas without any attempt at refilling, although most of the weight of a filled dispenser is tied up in the weight of the metal necessary to withstand the pressures involved. It is apparent, therefore, that the distribution of millions of these units to the far-flung combat areas for one use only, means the transportation of large quantities of metal in perfectly good dispensers which are not reused. The amount of shipping for this one use is no small item aside from the initial cost of manufacture, although the insecticide and dispensers constitute an important and necessary part of the equipment for the military forces. The same considerations apply to the civilian distribution and use of aerosol dispensers.

The primary object therefore of my invention is to provide a portable apparatus which may be readily shipped and operated in a combat area or other suitable location for refilling these aerosol dispensers after their original charge has been dispensed. Such an apparatus may be located at gasoline stations, hardware stores, or other suitable places.

A further object of my invention is to provide an apparatus for filling aerosol bombs in the field and which may be readily handled, assembled and operated by one or two persons.

An important feature of my invention is the provision of a knock-down apparatus assembly that can be compactly crated in easily-handled crates, and that can be assembled and dismantled by one man. It is proposed that this refilling apparatus be shipped to combat areas or other locations and that the aerosol mixture be shipped in large cylinders, for example, in the standard nitrogen cylinder which weighs approximately 127 pounds empty, and which will hold about 100 pounds of the aerosol charge mixture, sufficient to fill about 100 of the dispensers.

According to my invention the portable apparatus comprises a framework or mounting for the large cylinder or master container of aerosol solution, a mounting for an aerosol dispenser adapted to seal it in a position for refilling, a pair of alternately-operative measuring cylinders connected into a four-way valve, a connecting line leading from the lower portion of the master container to the four-way valve, and a line leading from the four-way valve to the dispenser-filling connection. A "Freon" aerosol solution, such as that described, will have a pressure of about 200 pounds per square inch or more, absolute, depending upon the temperature, for example about 236 pounds at 140° F. The master container holding this solution, however, is preferably pressured with a gas such as nitrogen which provides a source of motive power for forcing the solution into the dispensers. In general, the operation includes the steps of mounting the dispenser in position for refilling, operating the four-way valve to admit solution to one of the cylinders to operate a piston therein, which in turn operates a piston in the second cylinder to force aerosol solution therefrom through the four-way valve into the aerosol dispenser. The four-way valve is now turned to an off position, the dispenser valve closed, and an empty dispenser to be filled inserted in its place. This dispenser is now filled by reversing the position of the four-way valve so that aerosol solution is supplied to the empty cylinder from which the piston in the filled cylinder is operated to force the solution therein into the dispenser. In this manner the nitrogen pressure in the master container is utilized, with any necessary re-pressuring with nitrogen, until the solution therein has been exhausted, after which a new container of the aerosol solution is mounted in the apparatus, pressured with nitrogen and connected up to continue the filling operations.

Other features, objects and advantages of the present invention will be described in detail in connection with the accompanying drawings, in which:

Fig. 1 is a front elevational view showing an apparatus assembly constructed and assembled in accordance with a preferred form of the present invention.

Fig. 2 is a side view of a portion of the frame for mounting the filling equipment.

Fig. 3 is a cross-sectional view showing in diagrammatic manner the structure and arrangement of the four-way valve.

Fig. 4 is a large detailed view partly in broken section showing in a diagrammatic manner the structure of the filling connection and related parts of the apparatus.

Fig. 5 is a horizontal view partly in broken section of the cylinder-grab mechanism for mounting the master container.

A preferred form of apparatus for carrying out the filling of aerosol dispensers in accordance with my invention is shown in Fig. 1, in which the apparatus elements are mounted on a knockdown frame which comprises a pair of A-frames 10 and 12, shown in side view in Fig. 2, and connected together front and back by means of bottom braces 14. The frame also includes a filling stand 16 attached to the side of the A-frame 12 by means of keys or other fastenings not shown. Each of the A-frames 10 and 12 is made primarily of channel iron members cut and assembled in the manner shown in Fig. 2. Each A-frame comprises a lower channel member 18 having bent-up ends which fit in front and back channel members 20, the latter being attached together at the top in spaced relation by a channel member 22 held in place by keys 23. The lower portions of the channel members 20 are provided with welded-in webs 24 for retaining the bent-up projections of the bottom member 18. Each of the A-frames is provided with cross-braces 25 attached at their lower ends to the members 20 by loose rivets so that they may be folded with their respective side members 20. The free ends of the cross braces 25 are attached to the opposite member 20 by means of pins. The bottom braces 14 comprise an angle iron welded to end gusset plates which are in turn keyed to the back and front of the A-frames 10 and 12 by hooks 26 set in and welded to the channel irons 20. Each brace 14 also preferably includes end lugs 27 which engage the outside of the channel members 20.

The improved apparatus includes a replaceable master container 28 initially filled with the aerosol solution to be used in filling the dispensers. The master containers, containing the desired quantity of solution, are preferably shipped to their point of use at the normal pressure of the aerosol solution which in the example given is about 60 pounds per square inch at 60° F. At the point of use the containers are preferably pressured with a gas such as nitrogen, which may be shipped in the usual nitrogen containers, so that an operating partial pressure of nitrogen of about 200 pounds or more per square inch is available for forcing the aerosol solution from the containers into the dispensers. Since the nitrogen in the master container expands as the liquid level therein falls during the filling operation, the partial pressure of nitrogen will began at some maximum value, 500 pounds per square inch gage, and will decrease to some minimum value which depends upon the resistance to be overcome in the interactuated measuring cylinders. It will usually be necessary therefore to re-pressure the master cylinder several times with nitrogen before it is exhausted of its charge of aerosol solution.

The master container 28, as shown in Fig. 1, is mounted in a rotatable grab mechanism 30 supported by the A-frames 10 and 12. The mounting for the grab mechanism 30 includes a rotatable trunnion 32 and a stationary trunnion 34 mounted in pillow blocks attached on top of the A-frames 10 and 12. The trunnion 34 is rotatable in a sleeve 35 attached to the grab mechanism. In Fig. 5 the grab device is shown more in detail, and includes a steel back band 36 and a pair of pivoted arms 38 which are to be drawn up tightly around the cylinder 28 by means of a swing bolt, as shown. The back band 36 and the arms 38 are lined with brake lining 40 to aid in obtaining a secure hold on the cylinder 28. The trunnion 32 is mounted in a fixed position in a sleeve 42 on which is fixed a disk wheel 44 provided with holes at 180° with respect to each other and in vertical alignment with respect to the cylinder 28. The wheel 44 is used in connection with a stop-pin device 46 mounted on a plate 48 which is welded to member 22. The device 46 includes a spring-operated stop-pin 50 and a handle 52.

When the cylinder 28 is to be mounted in the frame, the cylinder is set upright on a wooden block between the A-frames, the grab 30 is then applied to the cylinder, after which the wooden block is removed. The top-pin is pulled away from the top hole in the wheel 44, and the cylinder 28 is thereupon rotated on the trunnions 32 and 34, through 180°. As the cylinder 28 reaches the position shown in Fig. 1, the stop-pin 50 is forced by the spring in the device 46 into the opposite hole in the wheel 44, and the cylinder is locked in inverted position, ready to be connected into the filling system.

The cylinder 28 is provided with the usual valved connection 54 from which a pipe 56, such as flexible hose or small copper tubing, leads to the upper port 57 of a four-way, four-port 90° turn valve 58 (Fig. 1), mounted on a bracket at the top of the stand 16. The four-way valve 58 has an operating handle as shown in Fig. 1 for turning it to the operating positions and to "off." This valve may be of conventional well-known construction. In the diagrammatic showing in Fig. 3 of the drawings, the valve 58 is provided with side ports 59 and 60 which are conected respectively by pipes or tubing 61 and 62 into the upper and lower portions, respectively, of hydraulic measuring cylinders 64 and 66. The lower port 67 of the four-way valve is connected to a member 68 comprising a filling connection. A cross-section of the four-way valve 58 is shown in Fig. 3 in which the plug 70, rotated by a hand wheel shown in Fig. 1, is provided with passageways 72 and 74 for simultaneously making two alternate connections.

The hydraulic measuring cylinders 64 and 66 may be of any suitable design but are shown as being mounted in square cylinder heads bolted together, the heads in turn being fastened by bolts or other suitable means, not shown, to channel brackets 76 which are welded upon the filling stand 16. The cylinders 64 and 66 are in spaced vertical alignment and a piston rod 78 of the lower cylinder is connected to a piston rod 80 of the upper cylinder by a flanged connection 28. Both of the cylinders 64 and 66 are preferably provided with the usual reduced orifice-type of cushioning device to prevent end-of-stroke banging. Both cylinders are single-acting, and therefore the maintenance of stuffing boxes is avoided. Each cylinder is provided with a thermometer 84 for indicating the temperature of the aerosol solution therein. The volume of charge in the cylinders 64 and 66 is adjustable and is determined by the volume swept by the pistons therein. The adjustment of the charge is made by means of a calibrated vernier 86 attached to the piston rod 78, and threaded upon the flanged coupling hub for the piston rod 78, which comprises a part of the inter-cylinder shaft. The calibrated vernier 86 is used to change the length of the inter-cylinder shaft and preferably carries the same figures as the thermometers 84. The adjustment is made by the operator by turning the vernier until the figure on the vernier opposite the arrow on the flange 82 is the same as the figure on the thermometer dials indicating the temperature of the aerosol mixture in the cylinders. The calibrations can be made in degrees Fahrenheit or numbers from zero to 10, if desired. Thus with the unit calibrated, the problem of obtaining the correct weight of fill in each dispenser is resolved into a mere setting of the vernier 86 to obtain the proper displacement stroke. If the cylinders 64 and 66 have an internal diameter of three inches, the length of the stroke of the pistons therein is made adjustable between about 3 and 3.4 inches in order to fill each dispenser with one pound of the solution.

The dispenser stand 16, which has a bottom bracket, also includes means for holding a dispenser 88 and for forcing it into contact with the filling member 68. This means includes a cam 90 pivoted on a bracket 92 which is welded to the stand 16. The cam 90 is provided with a hand lever 94. The dispenser 88 is inserted in a cup 96 on top of a spring therein, the cup being mounted on the top of a cam rider 98 adjustable with respect to the cup 96. The cam rider assembly is mounted in guide bearings 100 attached to the dispenser stand 16, so that the operation of the cam 90 moves the rider assembly up to jam the dispenser into contact with the filling member 68.

The structure and arrangement of the filling member 68 in connection with the dispenser 88 is shown in Fig. 4. In this view it will be seen that the dispenser 88 is provided with a valve 101, a rather wide flat-topped valve screw cap or wheel 102, through which a spray-head seat 104 projects, and with an inside standpipe 105. As the dispenser is forced up against the filling member 68 by the cam 90, the projection 104 extends into a gasket 106 preferably of neoprene which is press-fitted into the teat end of the filling member 68. This gasket 106 seals against the flat top of the valve screw cap 102 and around the spray head projection 104 which is aligned with the small duct in the member 68. At the same time the screw cap 102 contacts the internal conical section of a shouldered grab 108 which is keyed to the member 68 by a key 110, and forced down by means of a spring 112 which bears against a collar 114 set on the member 68.

A dispenser is prepared for filling by dropping it in the cup 96, which is designed to fit the dispenser with relatively small clearance. A different cup may be used for a dispenser of different design. The lever 94 is then forced up so that the dispenser valve is jammed against the teat gasket 106 with a very high sealing load so that a tight connection between the dispenser valve and the filling member 68 is made. The dispenser valve is then opened by merely twisting the dispenser body in the cup 96 since the valve screw wheel 102 is held from turning by the grab 108. After the dispenser has been filled, its valve is closed by again twisting the dispenser body in the cup 96 while the valve wheel is held by the grab 108. The dispenser is then disconnected by lowering the lever 94.

The operation of the apparatus of the present invention for filling aerosol dispensers in the field is very simple and may be readily carried out by one man. After the apparatus is assembled, the master cylinder pressured, mounted in the grab 30, connected up as shown in Fig. 1 and the cylinder 66 filled, the operator commences the filling of the dispenser by dropping it in the cup 96, raising the lever 94 until the stop on the cam 90 engages the rider 98. The body of the dispenser 88 is then turned to open the dispenser valve, after which the four-way valve 58 is operated by the hand wheel shown in Fig. 1, for example, to supply solution from the filled cylinder 66 to the dispenser 88. As the valve 58 is turned to effect this step, it is operated to connect the line 62 with the valve outlet 67 and the filling member 68 connected thereto, so as to permit solution to flow from the cylinder 66 to the dispenser 88. When the valve 58 is turned to this position the pressure in the master cylinder 28 forces solution through the four-way valve 58 and line 61 into the upper portion of cylinder 64 forcing the piston therein down, which also moves the piston in cylinder 66 down, thereby forcing the solution from the cylinder 66 into the dispenser. As soon as the dispenser is filled the body of the dispenser is turned in the cup 96 to close the dispenser valve, the four-way valve 58 is turned to an off position, the lever 94 is pulled down, and the filled dispenser removed from the cup 96. The operation is then repeated, beginning with the placing of an empty dispenser in the cup 96, the dispensers being filled alternately from cylinders 64 and 66. When the master cylinder 28 is emptied it is replaced by a full cylinder after pressuring it, and the filling operation is continued. The lines 56, 61 and 62 may be provided with cut-off valves if desired, to facilitate the making of connections and to prevent loss of solution when changing master containers.

A modified form of the apparatus shown in

Fig. 1 may be used if the master cylinder 28 is provided with a down pipe or standpipe inside so that the cylinder can be used in upright position. In a master cylinder so modified, the grab mechanism and framework could be eliminated, and the master cylinder merely stood upright on the ground alongside of the filling stand and then connected into the four-way valve. This would eliminate a number of parts and in some instances provide for an easier operation as well as reduce the cost of the field filling apparatus. The hydraulic measuring cylinder assembly may be mounted in a horizontal or other position, if desired, and on a different type of filling stand or associated mounting.

The apparatus of the present invention may be modified in various ways so that a minimum of parts will be required for successfully refilling the aerosol dispensers in a combat area or other locality. Other apparatus elements may be desirably used where available. For example, a small pump may be used in the line 56 instead of having the master cylinder pressured with nitrogen or other gas, but this may depend upon the availablity of some source of power for operating the pump. Likewise flow-control means other than the four-way valve 58 may be used for directing the flow of the aerosol solution in the apparatus. Individual valves in the lines 56, 61, 62 and 68 could be used for this purpose. However, the four-way valve is simple and effective and is therefore preferred. Various other modifications may be made in the apparatus without departing from the spirit and scope of the present invention.

Having described the invention in its preferred form, what is claimed as new is:

1. An apparatus for filling aerosol dispensers from a master container with an aerosol solution under high pressure, in which the pressure of a compressed medium in the master container is used as a motive force for filling the bombs, comprising a master container of the solution mounted in a rotatable grab on a pair of A-frames, a pair of hydraulic measuring cylinders mounted on a filling stand attached to one of said A-frames, said cylinders being arranged end to end in spaced relation with respect to each other, a piston in each cylinder, a piston rod adjustable as to length connecting the pistons for simultaneous movement, means for conducting solution from the lower portion of said container to the remote ends of said cylinders, a clamping means on said filling stand for holding a small valved dispenser in a filling position in contact with a filling connection, said connection including a grab for the valve of the dispenser, means for conducting solution from the remote ends of said cylinders to said filling connection, and control means for supplying solution from said master container alternately to the remote ends of said hydraulic cylinders and for supplying solution from said cylinders alternately to said filling connection.

2. An apparatus for filling aerosol dispensers in the field with an aerosol solution under high pressure, comprising a means for supplying the solution at a high pressure, a pair of hydraulic measuring cylinders mounted on a frame end to end in spaced relation with respect to each other, a piston in each cylinder, a piston rod connecting the pistons for simultaneous movement in said cylinders, the portion of the piston rod between the cylinders including means for varying the length of the piston rod for in turn varying the capacity of the measuring cylinders, a flow-control means mounted on the frame, means for conducting solution from the supply means to said flow-control means, separate means for conducting solution from said control means to the remote end of each of said cylinders, means on said frame for holding a small dispenser in a filling position in contact with a filling connection, means for conducting solution from said flow-control means to said filling connection, said flow-control means being adapted to direct solution from said supply means alternately to the remote ends of said hydraulic cylinders and to simultaneously direct solution from said hydraulic cylinders alternately to said filling connection.

ABRAHAM BROTHMAN.

REFERENCES CITED

The following references are of record in the file of this patent:

UNITED STATES PATENTS

| Number | Name | Date |
| --- | --- | --- |
| 797,124 | Kleinfeldt | Aug. 15, 1905 |
| 913,656 | Giron | Feb. 23, 1909 |
| 1,524,042 | Lemoine | Jan. 27, 1925 |
| 1,728,476 | Cone | Sept. 17, 1929 |

FOREIGN PATENTS

| Number | Country | Date |
| --- | --- | --- |
| 377,939 | Great Britain | 1932 |